(12) United States Patent
Dudar

(10) Patent No.: US 12,460,607 B2
(45) Date of Patent: Nov. 4, 2025

(54) METHOD AND SYSTEM FOR ADJUSTING PRESSURE IN A FUEL TANK

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/532,672

(22) Filed: Dec. 7, 2023

(65) Prior Publication Data

US 2025/0188894 A1 Jun. 12, 2025

(51) Int. Cl.
*F02M 25/08* (2006.01)
*F04F 5/20* (2006.01)

(52) U.S. Cl.
CPC .... *F02M 25/0809* (2013.01); *F02M 25/0836* (2013.01); *F04F 5/20* (2013.01)

(58) Field of Classification Search
CPC .... F02M 25/0809; F02M 25/0836; F04F 5/20
See application file for complete search history.

(56) References Cited

U.S. PATENT DOCUMENTS

| | | | | |
|---|---|---|---|---|
| 9,376,991 B2* | 6/2016 | Dudar | ............... | F02M 37/106 |
| 9,732,685 B2* | 8/2017 | Dudar | ............... | F02M 25/08 |
| 10,133,827 B2* | 11/2018 | Then | ............... | G06F 16/9024 |
| 10,830,189 B1* | 11/2020 | Dudar | ............... | F02M 25/089 |
| 11,104,222 B2* | 8/2021 | Dudar | ............... | B60K 15/03504 |
| 11,333,095 B1 | 5/2022 | Dudar | | |
| 11,840,991 B2 | 12/2023 | Dudar | | |
| 2019/0249623 A1* | 8/2019 | Kugo | ............... | F02D 41/004 |
| 2020/0141339 A1* | 5/2020 | Dudar | ............... | B60K 15/03504 |
| 2020/0291879 A1* | 9/2020 | Dudar | ............... | F02D 41/0032 |
| 2020/0370516 A1* | 11/2020 | Dudar | ............... | F02M 25/0836 |
| 2022/0412292 A1* | 12/2022 | Dudar | ............... | F02M 25/0854 |
| 2023/0250779 A1 | 8/2023 | Pichler et al. | | |

FOREIGN PATENT DOCUMENTS

DE 102018217662 A1 4/2020

* cited by examiner

*Primary Examiner* — Phutthiwat Wongwian
*Assistant Examiner* — Susan E Scharpf
(74) *Attorney, Agent, or Firm* — Vincent Mastrogiacomo; McCoy Russell LLP

(57) ABSTRACT

Methods and systems for diagnosing an evaporative emissions system are discussed. An example method includes diagnosing a venturi pump of an evaporative emissions system based on feedback from an evaporative leak check module (ELCM) pressure sensor and a fuel tank pressure transducer (FTPT). An engine of a vehicle is off during the diagnosing.

5 Claims, 7 Drawing Sheets

METHOD AND SYSTEM FOR ADJUSTING PRESSURE IN A FUEL TANK

FIELD

The present description relates generally to methods and systems for controlling pressure and vacuum in a fuel tank.

BACKGROUND/SUMMARY

As efforts to minimize vehicle emissions continues, vehicles are fitted with catalysts and storage devices configured to treat emissions or store emissions. An example storage device may include a fuel vapor canister, which is configured to store fuel vapors during conditions where the vapors may otherwise flow to atmosphere. The canisters may be signaled to release the vapors when an engine is running or when a fuel tank pressure is low. By doing this, vapor emissions to atmosphere are reduced.

Canisters may be arranged within an evaporative emission control system comprising a plurality of parts for controlling vapor flow, fuel tank depressurization rates, and the like. There are rules required by governments demanding that these components have diagnostic routines to determine their operation. Diagnosing the components of the evaporative emission control system may be challenging due to pressure changes of the system, dependency on engine operation, and ambient temperatures.

The inventors herein have recognized the above-mentioned issue and have developed a method for at least partially solving them. A method includes diagnosing a venturi pump of an evaporative emissions system based on feedback from an evaporative leak check module (ELCM) pressure sensor and a fuel tank pressure transducer (FTPT). In this way, the venturi pump may be diagnosed via pre-existing hardware, thereby incurring minimal additions for executing the diagnostic.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
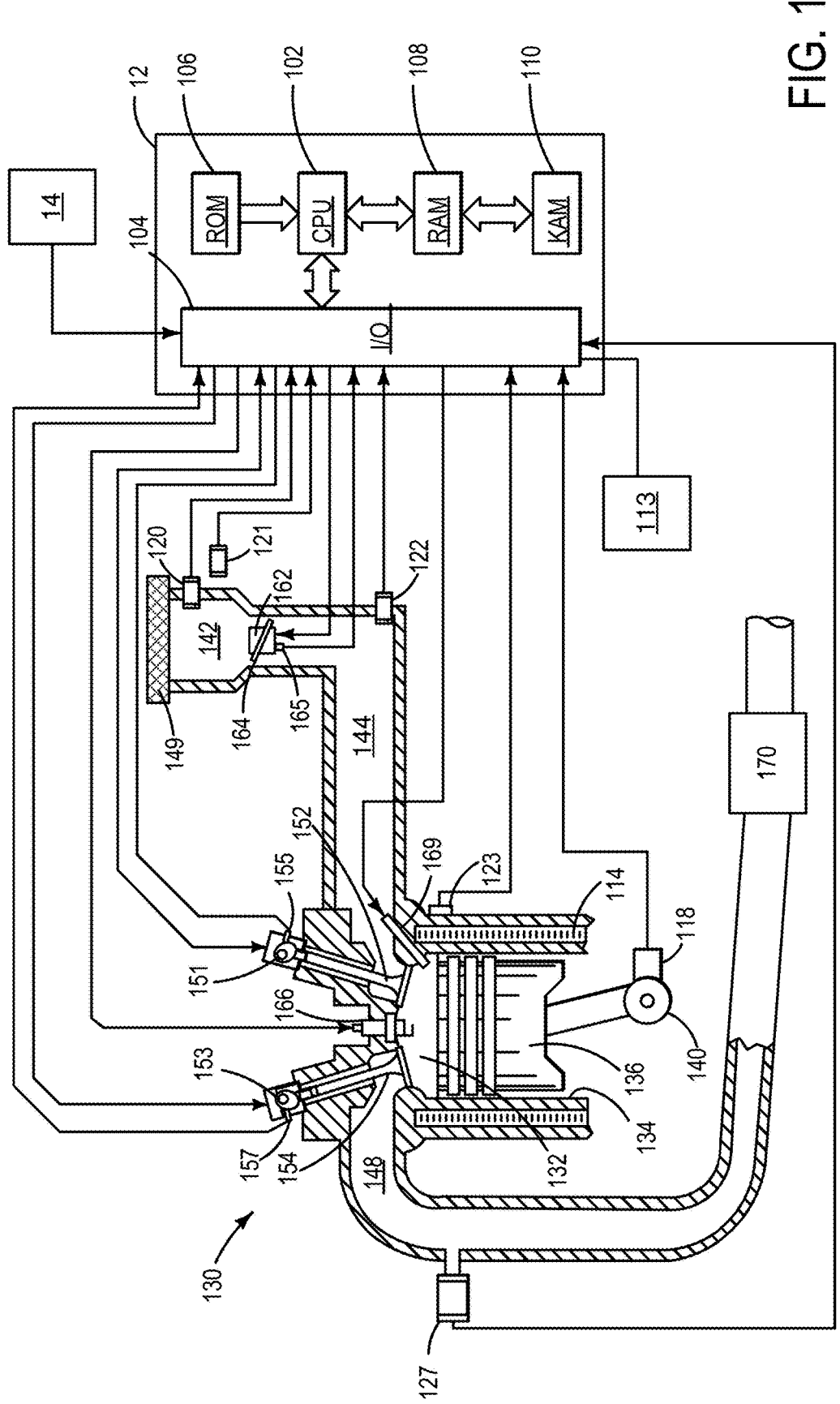
FIG. 1 shows an example internal combustion engine of a vehicle.
Figure 2:
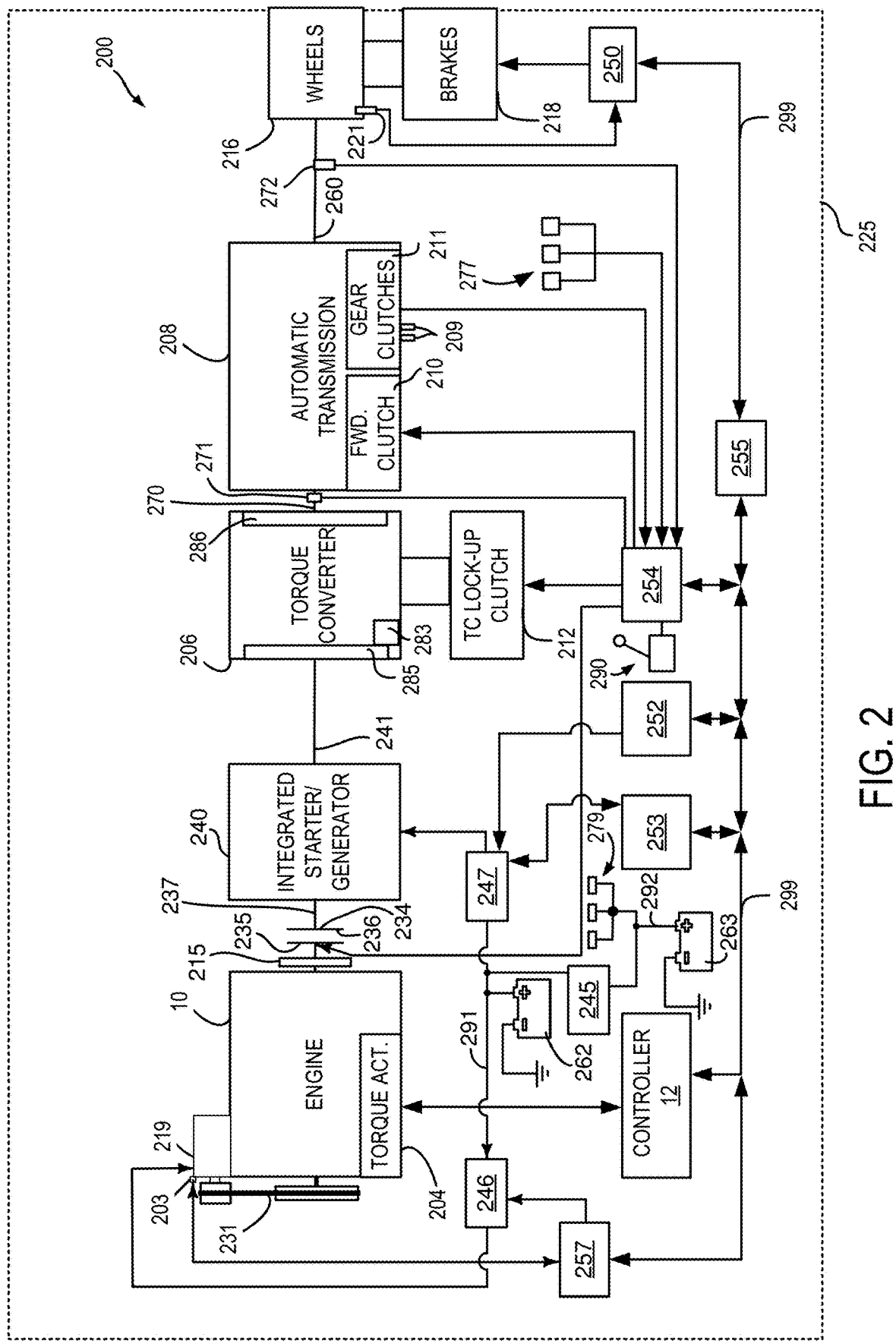
FIG. 2 shows an example powertrain of the vehicle that includes the engine.
Figure 3:
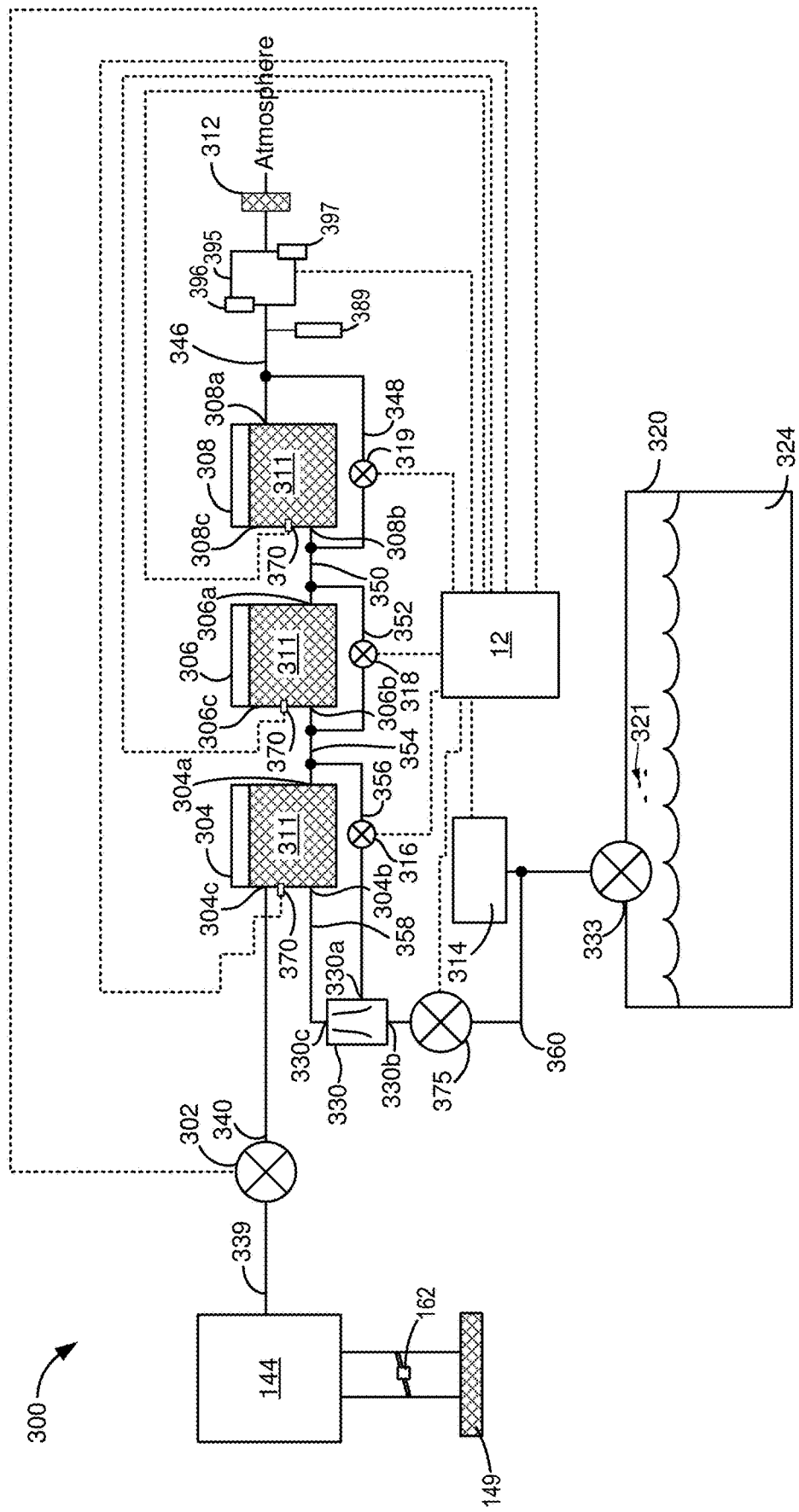
FIG. 3 shows a block diagram of an example evaporative emissions system for the vehicle.
Figure 4A:
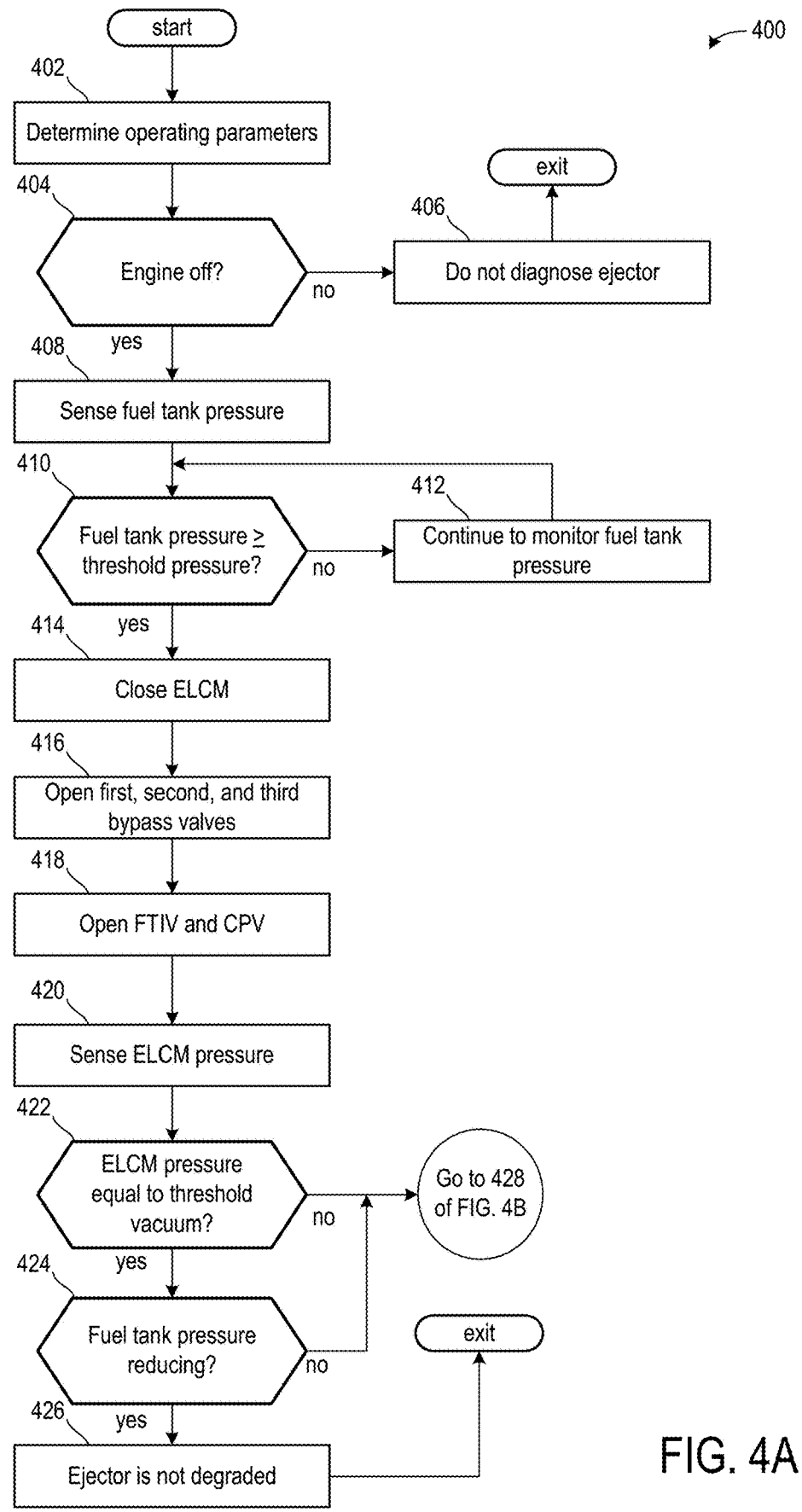
FIGS. 4A and 4B show an example method for diagnosing an evaporative emissions system for a vehicle.
Figure 4B:
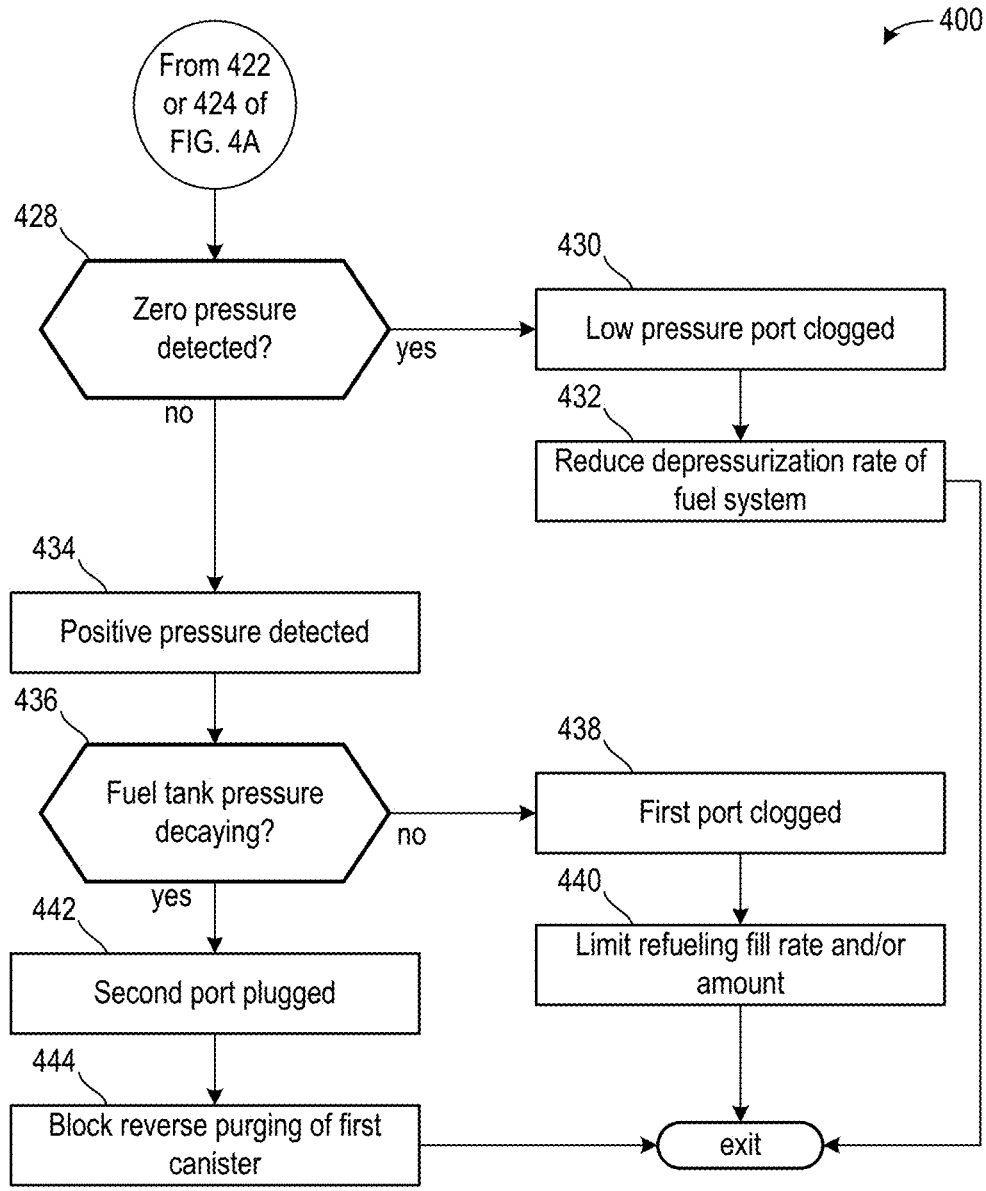
Figure 5:
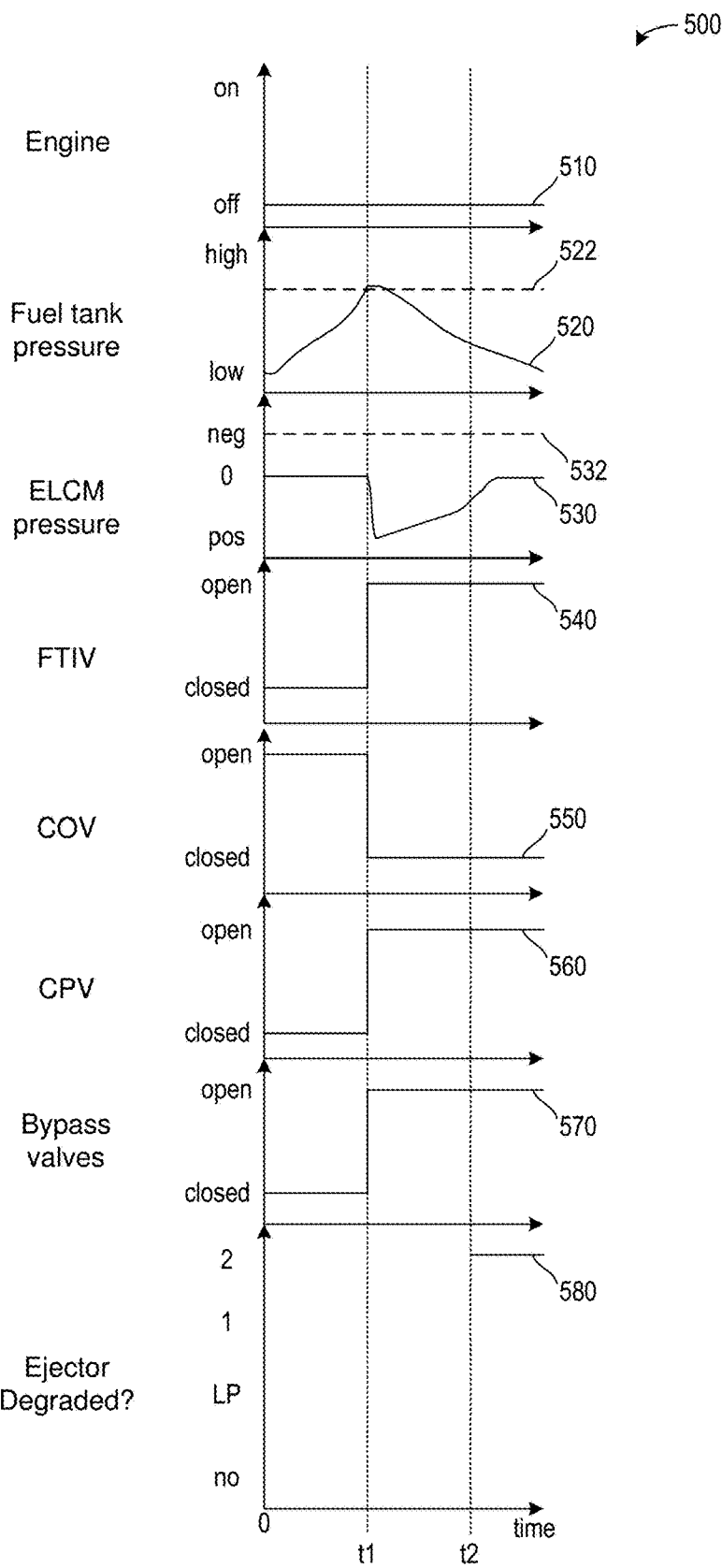
FIG. 5 shows an operating sequence of the evaporative emissions system executing the method of FIGS. 4A and 4B.
Figure 6A:
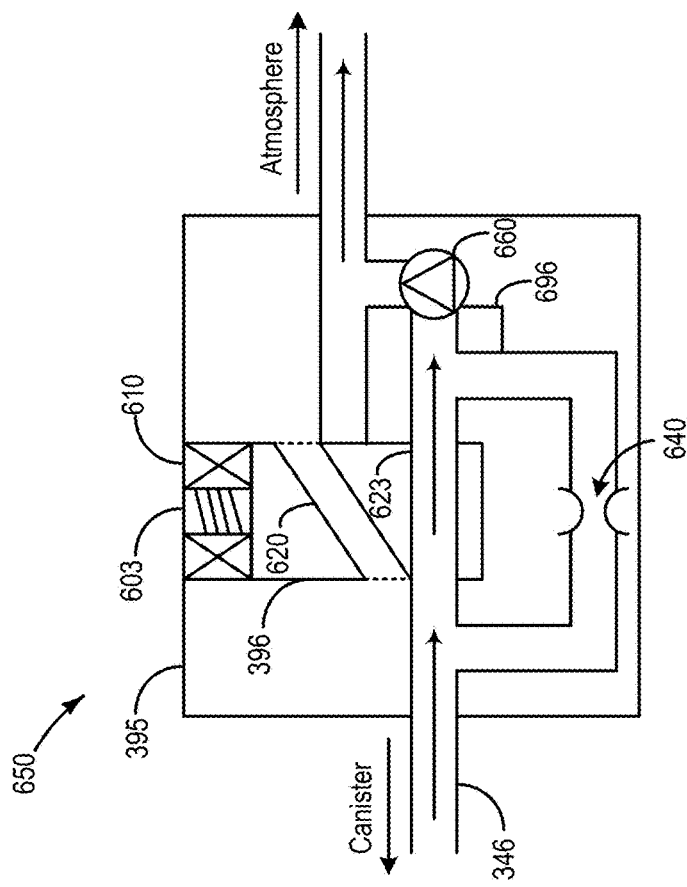
FIGS. 6A and 6B show examples positions of a change over valve (COV) of an evaporative leak check module (ELCM) of the evaporative emission system.
Figure 6B:
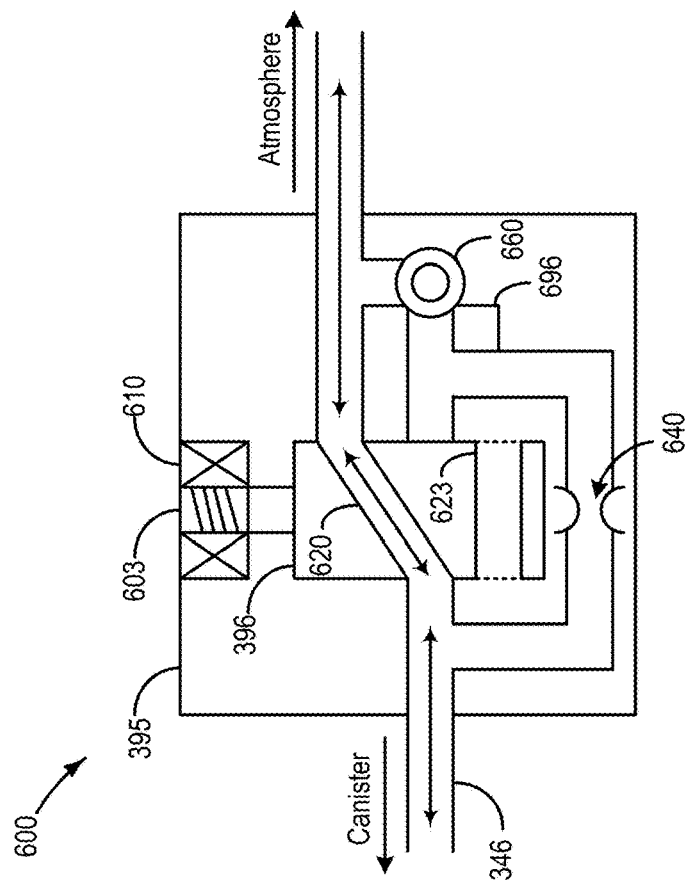

The following description relates to systems and methods for diagnosing an ejector of an evaporative emissions system. FIG. 1 shows an example internal combustion engine of a vehicle. FIG. 2 shows an example powertrain of the vehicle that includes the engine. FIG. 3 shows a block diagram of an example evaporative emissions system for the vehicle. FIGS. 4A and 4B show an example method for diagnosing an evaporative emissions system for a vehicle. FIG. 5 shows an operating sequence of the evaporative emissions system executing the method of FIGS. 4A and 4B. FIGS. 6A and 6B show examples positions of a change over valve (COV) of an evaporative leak check module (ELCM) of the evaporative emission system.

Referring now to FIG. 1, a schematic diagram showing one cylinder of a multi-cylinder engine 130 in an engine system 100 is shown. Engine 130 may be controlled at least partially by a control system including a controller 12 and by input from an autonomous driver or controller 14. Alternatively, a vehicle operator (not shown) may provide input via an input device, such as an engine torque, power, or air amount input pedal (not shown).

A combustion chamber 132 of the engine 130 may include a cylinder formed by cylinder walls 134 with a piston 136 positioned therein. The piston 136 may be coupled to a crankshaft 140 so that reciprocating motion of the piston is translated into rotational motion of the crankshaft. The crankshaft 140 may be coupled to at least one drive wheel of a vehicle via an intermediate transmission system. Further, a starter motor (not shown) may be coupled to the crankshaft 140 via a flywheel to enable a starting operation of the engine 130.

Combustion chamber 132 may receive intake air from an intake manifold 144 via an intake passage 142 and may exhaust combustion gases via an exhaust passage 148. The intake passage 142 includes an intake air filter 149. The intake manifold 144 and the exhaust passage 148 can selectively communicate with the combustion chamber 132 via respective intake valve 152 and exhaust valve 154. In some examples, the combustion chamber 132 may include two or more intake valves and/or two or more exhaust valves.

In this example, the intake valve 152 and exhaust valve 154 may be controlled by cam actuation via respective cam actuation systems 151 and 153. The cam actuation systems 151 and 153 may each include one or more cams and may utilize one or more of cam profile switching (CPS), variable cam timing (VCT), variable valve timing (VVT), and/or variable valve lift (VVL) systems that may be operated by the controller 12 to activate, deactivate (e.g., hold in a closed position for an engine cycle of two revolutions), and vary timing of valve operation. The position of the intake valve 152 and exhaust valve 154 may be determined by position sensors 155 and 157, respectively. In alternative examples, the intake valve 152 and/or exhaust valve 154 may be controlled by electric valve actuation. For example, the cylinder 132 may alternatively include an intake valve controlled via electric valve actuation and an exhaust valve controlled via cam actuation including CPS and/or VCT systems.

A fuel injector 169 is shown coupled directly to combustion chamber 132 for injecting fuel directly therein in proportion to the pulse width of a signal received from the controller 12. In this manner, the fuel injector 169 provides what is known as direct injection of fuel into the combustion chamber 132. The fuel injector may be mounted in the side of the combustion chamber or in the top of the combustion chamber, for example. Fuel may be delivered to the fuel injector 169 by a fuel system (not shown) including a fuel tank, a fuel pump, and a fuel rail. In some examples, the combustion chamber 132 may alternatively or additionally include a fuel injector arranged in the intake manifold 144 in a configuration that provides what is known as port injection of fuel into the intake port upstream of the combustion chamber 132.

Spark is provided to combustion chamber 132 via spark plug 166. The ignition system may further comprise an ignition coil (not shown) for increasing voltage supplied to spark plug 166. In other examples, such as a diesel, spark plug 166 may be omitted.

The intake passage 142 may include an intake throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 132 among other engine cylinders. The position of the throttle plate 164 may be provided to the controller 12 by a throttle position signal. The intake passage 142 may include a mass air flow sensor 120 and a manifold air pressure sensor 122 for sensing an amount of air entering engine 130. Barometric pressure may be determined via sensor 121.

An exhaust gas sensor 127 is shown coupled to the exhaust passage 148 upstream of an emission control device 170 according to a direction of exhaust flow. The sensor 127 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 127 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 170 is shown arranged along the exhaust passage 148 downstream of the exhaust gas sensor 127. The device 170 may be a three-way catalyst (TWC), $NO_x$ trap, various other emission control devices, or combinations thereof. In some examples, during operation of the engine 130, the emission control device 170 may be periodically reset by operating at least one cylinder of the engine within a particular air-fuel ratio.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 130, in addition to those signals previously discussed, including measurement of inducted mass air flow (MAF) from the mass air flow sensor 120; engine coolant temperature (ECT) from a temperature sensor 123 coupled to a cooling sleeve 114; an engine position signal from a Hall effect sensor 118 (or other type) sensing a position of crankshaft 140; throttle position from a throttle position sensor 165; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 144. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 (e.g., non-transitory memory) can be programmed with computer readable data representing non-transitory instructions executable by the processor 102 for performing at least portions of the methods described below as well as other variants that are anticipated but not specifically listed. CPU 102 may sample output of one or more sensors via A/D converters within I/O 104 and store the voltage/pressures/ etc. to RAM memory. Thus, controller 12 may operate actuators to change operation of engine 130. In addition, controller 12 may post data, messages, and status information to human/machine interface 113 (e.g., a touch screen display, heads-up display, light, etc.).

During operation, each cylinder within engine 130 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 132 via intake manifold 144, and piston 136 moves to the bottom of the cylinder so as to increase the volume within combustion chamber 132. The position at which piston 136 is near the bottom of the cylinder and at the end of its stroke (e.g. when combustion chamber 132 is at its largest volume) is typically referred to by those of skill in the art as bottom dead center (BDC).

During the compression stroke, intake valve 152 and exhaust valve 154 are closed. Piston 136 moves toward the cylinder head so as to compress the air within combustion chamber 132. The point at which piston 136 is at the end of its stroke and closest to the cylinder head (e.g. when combustion chamber 132 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 166, resulting in combustion.

During the expansion stroke, the expanding gases push piston 136 back to BDC. Crankshaft 140 converts piston movement into a rotational torque of the rotary shaft. Finally, during the exhaust stroke, the exhaust valve 154 opens to release the combusted air-fuel mixture to exhaust passage 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded calipers). Further, the vehicle system controller 255 may provide commands to engine controller 12, electric machine controller 252, transmission controller 254, and controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first slowing power from electric machine controller 252 and a second slowing power from engine controller 12, the first and second powers providing a desired driveline power at vehicle wheels 216. Vehicle system controller 255 may also request a friction slowing power via controller 250. The slowing powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and controller 250. Alternatively, the vehicle system controller 255 and the engine controller 12 may be a single unit while the electric machine controller 252, the transmission controller 254, and the controller 250 are standalone controllers.

In this example, powertrain 200 may be powered by engine 10 and electric machine 240. In other examples, engine 10 may be omitted. Engine 10 may be started with an engine starting system shown in FIG. 1, via integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include an integrated starter/generator (ISG) 219. ISG 219 may be coupled to crankshaft 40 of engine 10 via a coupling 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no couplings, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel calipers 218. In one example, friction wheel calipers 218 may be engaged in response to a human driver pressing their foot on a foot pedal (not shown) and/or in response to instructions within caliper controller 250. Further, controller 250 may apply calipers 218 in response to information and/or requests made by vehicle system controller 255. In the same way, a frictional force may be reduced to wheels 216 by disengaging wheel calipers 218 in response to the human driver releasing their foot from a foot pedal, controller 250 instructions, and/or vehicle system controller instructions and/or information. For example, vehicle calipers may apply a frictional force to wheels 216 via controller 250 as part of an automated engine stopping procedure. A counteracting torque may be determined as a function of foot pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative operation, vehicle system controller may provide a negative desired wheel power (e.g., desired or requested powertrain wheel power) based on vehicle speed and foot pedal position. Vehicle system controller 255 then allocates a fraction of the negative desired wheel power to the ISG 240 and the engine 10. Vehicle system controller may also allocate a portion of the requested power to friction calipers 218 (e.g., desired friction counteractive wheel power). Further, vehicle system controller may notify transmission controller 254 that the vehicle is in regenerative mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction calipers 218 so that the desired wheel power is provided by a combination of negative power (e.g., power absorbed) via friction calipers 218, engine 10, and ISG 240.

Accordingly, power control of the various powertrain components may be supervised by vehicle system controller 255 with local power control for the engine 10, transmission 208, electric machine 240, and calipers 218 provided via engine controller 12, electric machine controller 252, transmission controller 254, and controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine negative engine power may be provided by rotating the engine with the engine generating power that is insufficient to rotate the engine. Thus, the engine may generate a regenerative power via operating at a low power while combusting fuel, with one or more cylinders deactivated (e.g., not combusting fuel), or with all cylinders deactivated and while rotating the engine. The amount of engine regenerative power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors.

If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Controller 250 receives wheel speed information via wheel speed sensor 221 and counteractive requests from vehicle system controller 255. Controller 250 may provide slowing responsive to a wheel power command from vehicle system controller 255. Controller 250 may also provide anti-lock and vehicle stability operation to increase vehicle performance. As such, controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, a block diagram of an example evaporative emissions system 300 is shown. Evaporative emissions system 300 includes a canister purge valve (CPV) 302, a first carbon filled canister 304, a second carbon filled canister 306, a third carbon filled canister 308, an evaporative leak check module (ELCM) 395, a dust box 312, a fuel tank isolation valve (FTIV) 375, and a fuel tank 320. Carbon filled canisters 304-308 may include activated carbon 311 to store fuel vapors. The first carbon filled canister 304 is an upstream canister and the third carbon filled canister 308 is a downstream canister relative to a direction of fluid flow. The system of FIG. 3 shows three carbon filled canisters, but the principals and methods described herein may be applied to evaporative emissions systems with two carbon filled canisters or more than three carbon filled canisters. Three existing smaller volume carbon filled canisters may be less expensive than one larger carbon filled canister that has the same volume as the three smaller volume carbon filled canisters.

Canister purge valve 302 may selectively provide fluidic communication between first carbon filled canister 304 and intake manifold 144. Controller 12 may adjust operating states of each valve shown in FIG. 3. Controller 12 may also receive output from fuel tank pressure sensor 314.

In some examples, evaporative emissions control system may further include an evaporative level check monitor (ELCM) 395. ELCM 395 may be disposed in conduit 346 and may be configured to control venting and/or assist in detection of evaporative emissions. As an example, ELCM 395 may include a vacuum pump for applying negative pressure to the fuel system when administering a test for evaporative emissions. In some embodiments, the vacuum pump may be configured to be reversible. In other words, the vacuum pump may be configured to apply either a negative pressure or a positive pressure on the evaporative emissions control system and fuel system. ELCM 395 may further include a reference orifice (not shown), a pressure sensor 397, and a changeover valve (COV) 396. A reference check may thus be performed whereby a vacuum may be drawn across the reference orifice, where the resulting vacuum level comprises a vacuum level indicative of an absence of evaporative emissions. For example, following the reference check, the fuel system and evaporative emissions control system may be evacuated by the ELCM vacuum pump. In the absence of evaporative emissions, the vacuum may pull down to the reference check vacuum level. Alternatively, in the presence of evaporative emissions, the vacuum may not pull down to the reference check vacuum level.

During select engine and/or vehicle operating conditions, such as after an emission control device light-off temperature has been attained (e.g., a threshold temperature reached after warming up from ambient temperature) and with the engine running, the controller 12 may control the ELCM 395 changeover valve (COV) 396 to enable at least one of the fuel vapor canisters to be fluidically coupled to atmosphere. For example, ELCM COV 396 may be configured in a first position (e.g. opened), where the first position includes the third canister 308 fluidically coupled to atmosphere, except during pressure tests performed on the system. In one example, under natural aspiration conditions (e.g. intake manifold vacuum conditions), ELCM COV 396 may be configured in a second position (e.g. closed) to seal the third canister 308 from atmosphere. By commanding ELCM COV 396 to the second position, the evaporative emissions control system and fuel system may be evacuated in order to ascertain the presence or absence of evaporative emissions.

Each of carbon filled canisters 304-308 include a vent port (e.g., 304a, 306a, and 308a), a load port (e.g., 304b, 306b, and 308b), and a purge port (e.g. 304c, 306c, and 308c). The purge ports 306c and 308c are plugged.

In one example, the ELCM 395 and an ELCM pressure sensor 389 may be used to execute a leak detection diagnostic of the fuel system. In some examples, such as examples where the vehicle includes only an internal combustion engine, the ELCM 395 and the ELCM pressure sensor 389 may be omitted. If the ELCM 395 is omitted, a dust box or similar device may be included between the fuel system and atmosphere. The ELCM pressure sensor 389 may be configured to sense a pressure between a downstream canister (e.g., third canister 308) and the ELCM 395.

Evaporative emissions system 300 also includes an ejector 330. Herein, the ejector 330 is referred to as a venturi pump 330. The venturi pump 330 includes a low pressure port 330a, a first motive fluid port 330b, and a second motive fluid port 330c. Fuel vapors may flow from fuel tank 320 to venturi pump 330 when canister purge valve 302 and fuel tank isolation valve 375 are open. Fuel vapors may flow through first and second motive fluid ports 330b and 330c of venturi pump 330, which may draw air and/or fuel vapors into venturi pump 330 by way of low pressure port 330a and first bypass passage 356 when first bypass valve 316 is open. Air and/or fuel vapor may flow from venturi pump 330 to first carbon filled canister 304. Air and/or fuel vapor may flow from first carbon filled canister 304 to engine intake manifold 144 when engine intake manifold pressure is low and canister purge valve 302 is open.

In one example, the low pressure port 330a may be fluidly coupled directly to the ELCM 395 when the plurality of bypass valves is actuated to open positions. The first port 330b may be fluidly coupled to the conduit 360. The second port 330c may be fluidly coupled to the conduit 358. In one example, the conduit 360 and the conduit 358 form separate portions of a load line, which is a fluid passage divided by the venturi pump 330.

Fuel tank 320 is shown with a fuel fill limit vent valve (FLVV) 333. FLVV may close to prevent fuel flow into conduit 360 when fuel tank 320 is full of fuel 324. When fuel tank 320 is being filled and FLVV closes, pressure may build in fuel tank 320 such that the fuel filler nozzle (not shown in FIG. 3) stops flow of fuel into fuel tank 320. Fuel tank 320 may also hold fuel vapor 321.

Conduit 339 couples intake manifold 144 to canister purge valve 302 allowing fluidic communication between the two devices. Conduit 340 couples canister purge valve 302 and first carbon filled canister 304. Conduit 346 couples third carbon filled canister 308 and COV 390. Conduit 358 couples second motive fluid port 330c of venturi pump 330 to load port 304b of first carbon filled canister 304. Conduit 354 couples first carbon filled canister 304 and second carbon filled canister 306. Conduit 350 couples third carbon filled canister 308 and second carbon filled canister 306.

First carbon filled canister 304 includes a bypass passage or conduit 356 and a bypass valve 316 for selectively allowing and preventing air flow through conduit 356. Similarly, second carbon filled canister 306 includes a bypass passage or conduit 352 and a bypass valve 318 for selectively allowing and preventing air flow through conduit 352. Likewise, third carbon filled canister 308 includes a bypass passage or conduit 348 and a bypass valve 319 for selectively allowing and preventing air flow through conduit 348. Thus, conduits 348, 352, and 356 may allow air to flow around carbon filled canisters 304, 306, and 308. For example, if bypass valve 319 is open, air may be drawn from atmosphere and through passage 348 without passing through carbon filled canister 308 so that it may eventually be drawn into intake manifold 144. The air flow may follow the path of least resistance, which may be through a bypass passage if the bypass passage's bypass valve is open.

Loading of first carbon filled canister 304, second carbon filled canister 306, and third carbon filled canister 308 may be determined via temperature sensors 370, which are mounted therein. In particular, a change in temperature within the carbon filled canisters may indicate a mass of hydrocarbons stored within the carbon filled canisters.

FIG. 6A shows a first schematic depiction 600 of the evaporative leak check module (ELCM) 395 in a first configuration where a fuel vapor canister (such as canister 308 in FIG. 3) of the evaporative emissions control system is vented to atmosphere. FIG. 6B shows a second schematic depiction 650 of the ELCM 395 in a second configuration where the venturi pump is being diagnosed.

ELCM 395 includes the changeover valve (COV) 396, a vacuum pump 630, and a pressure sensor 696. In one example, pressure sensor 389 of FIG. 3 may be omitted if the ELCM 395 includes the pressure sensor 696. Vacuum pump 630 may be a reversible pump, for example, a vane pump. COV 396 may be moveable between a first and a second position. In the first position, as shown in FIG. 6A, air may flow through ELCM 395 via first flow path 620. In the second position, as shown in FIG. 6B, air may flow through ELCM 395 via second flow path 623. The position of COV 396 may be controlled by solenoid 610 via compression spring 603. ELCM 395 may also comprise reference orifice 640. Reference orifice 640 may have a diameter corresponding to the size of a threshold leak to be tested, for example, 0.02". In either the first or second position, pressure sensor 397 may generate a pressure signal reflecting the pressure within ELCM 395. Operation of pump 630 and solenoid 610 may be controlled via signals received from controller 12.

As shown in FIG. 6A, in the first configuration, COV 396 is in the first position, and pump 630 is deactivated. This configuration allows for air to freely flow between atmosphere and the canister via first flow path 620. This configuration may be used during a canister purging operation, for example, or during other conditions where the fuel vapor canister is to be vented to atmosphere. Upon receiving a request for refueling, the COV 396 may be actuated to the first position (first position of ELCM), to facilitate air flow through the canister and venting of the refueling vapor from the fuel tank to the canister.

As shown in FIG. 6B, COV 396 is in the second position, and pump 630 is off in a first direction. This configuration allows the venturi pump to be diagnosed with a higher vacuum signal. In other examples of the second position, the pump 630 may be activated to evacuate the evaporative emissions system. When the pump 630 is off (e.g., inactive), the pump 630 is sealed and blocks vapor flow from the conduit 346 to atmosphere. When the pump 630 is on (e.g., active), the pump 630 forces air from the conduit 346 to atmosphere.

Referring now to FIGS. 4A and 4B, an example method 400 for operating an evaporative emissions system is shown. In particular, the method may include executing a diagnostic for a venturi pump arranged in the load line of the evaporative emissions system. The method may further include adjusting operating parameters in response to the diagnostic being degraded (e.g., not passed). At least portions of method 400 may be included in and cooperate with a system as shown in FIGS. 1-3 and 6A-6B as executable instructions stored in non-transitory memory. The method of FIGS. 4A and 4B may cause the controller to adjust the actuators in the real world and receive data and signals from sensors described herein when the method is realized via executable instructions stored in controller memory.

At 402, method 400 determines vehicle operating conditions. Vehicle operating conditions may include but are not limited to ambient air temperature, engine speed, engine air flow amount, driver demand torque or power, intake manifold pressure, spark timing, barometric pressure, intake inlet pressure, fuel tank pressure, carbon filled canister hydrocarbon loads, and engine air-fuel ratio. Method 400 may determine or infer these conditions from the various sensors mentioned herein.

At 404, the method 400 may include determining if the engine is off. The engine may be off if the engine is not being fueled. As another example, the engine may be off if combustion is not occurring at the engine.

If the engine is not off, then at 406, the method 400 may include not diagnosing the ejector of the evaporative emissions system. If the engine is off, then at 408, the method 400 may include sensing a fuel tank pressure. The fuel tank pressure may be sensed via the FTPT.

At 410, the method 400 may include determining if the fuel tank pressure is greater than or equal to a threshold pressure. In one example, the threshold pressure is equal to a non-zero, positive value. The threshold pressure may be based on a pressure rise of the fuel tank due to higher ambient temperatures and/or liquid fuel heating up due to the engine running for a period of time prior to the engine off. In one example, the threshold pressure is equal to 30 in $H_2O$. In one example, the fuel tank pressure may be compared to the threshold pressure when the vehicle is parked and immobile. Additionally or alternatively, the vehicle may be in an all-electric mode and propelled by only an electric motor when the fuel tank pressure is compared to the threshold pressure to determine if entry conditions for the ejector diagnostic are met.

If the fuel tank pressure is less than (e.g., not greater than or equal to) the threshold pressure, then at 412, the method 400 may include continuing to monitor the fuel tank pressure.

If the fuel tank pressure is greater than or equal to the threshold pressure, then at 414, the method 400 may include closing the ELCM change over valve (COV). The evaporative emissions system may be sealed from atmosphere, which may provide a higher signal magnitude during the diagnostic. By doing this, efficacy of the diagnostic is increased.

At 416, the method 400 may include opening the first, second, and third bypass valves. The ejector and the ELCM pressure sensor may now be directly fluidly coupled to one another. In this way, the ELCM pressure sensor may be based on a function of the ejector.

At 418, the method 400 may include opening the FTIV and the CPV. In one example, the FTIV and the CPV are commanded open, via the controller, simultaneously. The fuel tank may be fluidly coupled to the ejector. Additionally, the first canister may be fluidly coupled to the ejector. In this way, each of the ports of the ejector may be fluidly coupled to separate portions of the evaporative emissions system.

At 420, the method 400 includes sensing an ELCM pressure. In one example, the ELCM pressure may be sensed by the ELCM pressure sensor. The ELCM pressure sensor may provide feedback to the controller regarding the ELCM pressure.

At 422, the method 400 may include determining if an ELCM pressure is equal to a threshold vacuum. In one example, the threshold vacuum may be equal to a non-zero number. The threshold vacuum may be based on an expected vacuum generated by the ejector in response to the ejector being open to the fuel tank. In one example, the threshold vacuum may be a dynamic value based on the fuel tank pressure, wherein as the fuel tank pressure increases, the threshold vacuum increases (e.g., more negative in pressure). In one example, the threshold vacuum is equal to −4 inH$_2$O.

If the ELCM pressure is equal to the threshold vacuum, then at 424, the method 400 may include determining if a fuel tank pressure is decreasing. The fuel tank pressure sensed via the FTPT. The FTPT may provide feedback to the controller regarding the fuel tank pressure.

If the fuel tank pressure is decreasing, then the method 400 may include determining that the ejector is not degraded at 426. Each of the ports of the ejector may be open to corresponding components of the evaporative emissions system, thereby allowing pressure to flow as anticipated. In one example, a flag is not set and operation of the evaporative emissions system is not adjusted.

If the ELCM pressure is not equal to the threshold vacuum (e.g., greater than the threshold vacuum), or if the fuel tank pressure is not decreasing, then the ejector is degraded and a non-negative pressure is sensed (e.g., a positive pressure or zero pressure). At 428, the method 400 may include determining if the ELCM pressure is equal to zero. If the ELCM pressure is equal to zero, then at 430, the method 400 may include determining the low pressure port, which connects the ejector to the ELCM, is clogged.

At 432, the method 400 may include reducing a depressurization rate of the fuel system. The ELCM may not depressurize the fuel tank when the low pressure port is clogged. In one example, the FTIV may be moved to a less open position to decrease an amount of vacuum directed to the fuel tank in order to reduce the reduce the depressurization rate. Additionally or alternatively, a flag may be set and the vehicle operator may be notified via text, email, an infotainment system alert, or other means of communication that maintenance is requested.

If zero pressure is not detected, then at 434, the method 400 may include a positive pressure being detected. The positive pressure may correspond to atmospheric pressure or the fuel tank pressure depending on a degradation type of the ejector.

At 436, the method 400 may include determining if the fuel tank pressure is decaying. If the fuel tank pressure is not decaying and remains constant, then at 438, the method 400 may include determining the first port is clogged. The fuel tank may be sealed from the ejector, in one example, when the first port is clogged.

At 440, the method 400 may include adjusting a refueling rate, including limiting a refueling fill rate and/or a fill amount. In one example, fuel tank vapors generated during a refueling event may be trapped in the fuel tank. As such, a lower fuel tank fill rate may reduce an amount of fuel vapor generated, which may enhance refueling conditions. Additionally or alternatively, the fill amount may be reduced to a fraction of the fuel tank fill limit, wherein the reduced fill amount is based on an anticipated fuel vapor generated according to a fuel fill rate. Additionally or alternatively, a flag may be set and the vehicle operator may be notified via text, email, an infotainment system alert, or other means of communication that maintenance is requested.

In some examples, additionally or alternatively, the controller may communicate to a human machine interface (HMI) and/or to a fuel station to adjust a refueling rate, including reducing the refueling fill rate. The HMI may include an infotainment system of the vehicle, a vehicle operator phone, or other device. The controller may indicate the ejector is degraded and suggest to the vehicle operator to reduce the refueling fill rate and/or indicate to the vehicle operator increase refueling times. The controller may signal to the fuel station, such as a smart fuel station with wireless communication capabilities and controls for modifying refueling conditions, to reduce the refueling fill rate.

Returning to 436, if the fuel tank pressure is decaying, then at 442, the method 400 may include determining the second port is clogged. The fuel tank vapors may flow to the plurality of canisters when the second port is clogged.

At 444, the method 400 may include adjusting a reverse purging of the first canister, including blocking reverse purging of the first canister to the fuel tank. Reverse purging may include flowing vapors from the first canister, through the venturi pump, through the FTIV, and directly to the fuel tank. Additionally or alternatively, a flag may be set and the vehicle operator may be notified via text, email, an infotainment system alert, or other means of communication that maintenance is requested.

Turning now to FIG. 5, it shows a graph 500 illustrating an operating sequence of the evaporative emissions system executing the method of FIGS. 4A and 4B. Plot 510 illustrates an engine condition. Plot 520 illustrates a fuel tank pressure and dashed line 522 indicates a threshold pressure. Plot 530 illustrates an ELCM pressure and dashed line 532 indicates a threshold vacuum. Plot 540 illustrates a FTIV position. Plot 550 illustrates a COV position. Plot 560 illustrates a CPV position. Plot 570 illustrates a position of the bypass valves. Plot 580 illustrates which port of an ejector is degraded or if the ejector is not degraded.

Prior to t1, the engine is off. The fuel tank pressure increases due to sunlight contacting the vehicle and/or due to high ambient temperatures. At t1, the fuel tank pressure is equal to a pressure greater than the threshold pressure. As such, entry conditions are met for the ejector diagnostic. The ELCM COV is commanded to the closed position. The bypass valves are commanded to open positions. The FTIV and the CPV are commanded to open positions. As such, the ELCM is sealed from atmosphere during the diagnostic. Additionally, the ejector is fluidly coupled to each of the ELCM, the first canister, and the fuel tank.

Between t1 and t2, the ELCM pressure increases to a positive pressure and then begins to decay. At t2, the diagnostic determines that the second port of the ejector is degraded.

The disclosure provides support for a method including diagnosing a venturi pump of an evaporative emissions system based on feedback from an evaporative leak check module (ELCM) pressure sensor and a fuel tank pressure transducer (FTPT). A first example of the method further includes determining an engine of a vehicle is off prior to the diagnosing, wherein the engine comprises the evaporative emissions system. A second example of the method, optionally including the first example, further includes opening a changeover valve (COV) of the ELCM prior to the diagnosing. A third example of the method, optionally including one or more of the previous examples, further includes where the evaporative emissions system comprises at least two fuel vapor storage canisters fluidically coupled in series, further comprising opening bypass valves corresponding to the at least two fuel vapor storage canisters prior to the diagnosing. A fourth example of the method, optionally including one or more of the previous examples, further includes opening a canister purge valve (CPV) and a fuel tank isolation valve (FTIV) prior to the diagnosing. A fifth example of the method, optionally including one or more of the previous examples, further includes where the diagnosing comprises indicating the venturi pump is not degraded in response to the ELCM sensing a negative pressure and a pressure detected by the FTPT decaying over time. A sixth example of the method, optionally including one or more of the previous examples, further includes where the diagnosing comprises indicating a port of the venturi pump is degraded in response to the ELCM sensing a positive pressure or zero pressure.

The disclosure provides additional support for a vehicle system including an engine, an evaporative emissions system comprising a plurality of canisters and a plurality of canister bypass valves, a venturi pump arranged in a load line extending from a fuel tank to a first canister of the plurality of canisters, an evaporative leak check module (ELCM) comprising a changeover valve (COV) and arranged between an atmosphere and a downstream canister in series of the plurality of canisters, and a controller with computer-readable instructions stored on memory thereof that when executed cause the controller to perform a diagnostic of the venturi pump in response to the engine being off and a fuel tank pressure being greater than or equal to a threshold pressure. A first example of the vehicle system further includes where the venturi pump comprises a low-pressure port fluidly coupled to a conduit housing a first canister bypass valve of the plurality of canister bypass valves, a first port fluidly coupled to an interior volume of the fuel tank, and a second port fluidly coupled to the first canister. A second example of the vehicle system, optionally including the first example, further includes where a pressure sensor arranged between the ELCM and the downstream canister. A third example of the vehicle system, optionally including one or more of the previous examples, further includes where a fuel tank pressure transducer (FTPT) arranged between the venturi pump and the fuel tank. A fourth example of the vehicle system, optionally including one or more of the previous examples, further includes where the instructions further cause the controller to indicate the diagnostic is passed in response to a vacuum at the ELCM being equal to a threshold vacuum and the fuel tank pressure decaying. A fifth example of the vehicle system, optionally including one or more of the previous examples, further includes where the instructions further cause the controller to indicate the diagnostic is degraded in response to vacuum not flowing to the ELCM from the venturi pump. A sixth example of the vehicle system, optionally including one or more of the previous examples, further includes where instructions further cause the controller to close the COV, open the plurality of canister bypass valves, open a fuel tank isolation valve arranged between the fuel tank and the venturi pump, and open a canister purge valve (CPV) arranged between the first canister and the engine. A seventh example of the vehicle system, optionally including one or more of the previous examples, further includes where the instructions further cause the controller to, responsive to the diagnostic being degraded, adjust one of a depressurization rate of the fuel tank, a refueling rate, and reverse purging the first canister.

The disclosure provides further support a hybrid vehicle system including an engine, a plurality of canisters arranged in series, an evaporative leak check module (ELCM) comprising a changeover valve (COV) and arranged between atmosphere and a downstream canister in series of the plurality of canisters, a venturi pump arranged in a load line extending from a fuel tank to an upstream canister of the plurality of canisters, the venturi pump comprising a low-pressure port fluidly coupled to the ELCM, a first port fluidly coupled to the load line, and a second port fluidly coupled to the load line, a pressure sensor arranged between the ELCM and the downstream canister, a fuel tank pressure transducer (FTPT) arranged between the venturi pump and the fuel tank, and a controller with computer-readable instructions stored on memory thereof that when executed cause the controller to execute a diagnostic of the venturi pump in response to the engine being off and a fuel tank pressure being greater than or equal to a threshold pressure. A first example of the hybrid vehicle system further includes where the instructions further enable the controller to indicate the diagnostic is passed in response to the pressure sensor sensing a negative pressure and the FTPT sensing a decaying fuel tank pressure. A second example of the hybrid vehicle system the instructions further enable the controller to indicate the diagnostic is not passed in response to the pressure sensor sensing a non-negative pressure. A third example of the hybrid vehicle system, optionally including one or more of the previous examples, further includes where the instructions further enable the controller to adjust one of a depressurization rate of the fuel tank, a refueling fill rate of the fuel tank, and a reverse purging of the upstream canister in response to the diagnostic not being passed. A fourth example of the hybrid vehicle system, optionally including one or more of the previous examples, further includes where the plurality of canisters further comprises a canister arranged between the upstream canister and the downstream canister.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid vehicle system, comprising:
an engine;
a plurality of canisters arranged in series;
an evaporative leak check module (ELCM) comprising a changeover valve (COV) and arranged between atmosphere and a downstream canister in series of the plurality of canisters;
a venturi pump arranged in a load line extending from a fuel tank to an upstream canister of the plurality of canisters, the venturi pump comprising a low-pressure port fluidly coupled to the ELCM, a first port fluidly coupled to the load line, and a second port fluidly coupled to the load line;
a pressure sensor arranged between the ELCM and the downstream canister;
a fuel tank pressure transducer (FTPT) arranged between the venturi pump and the fuel tank; and
a controller with computer-readable instructions stored on memory thereof that when executed cause the controller to:
execute a diagnostic of the venturi pump in response to the engine being off and a fuel tank pressure being greater than or equal to a threshold pressure via closing the COV, and opening a plurality of bypass valves, each of the plurality of bypass valves corresponding to each of the plurality of canisters.

2. The hybrid vehicle system of claim 1, wherein the instructions further enable the controller to indicate the diagnostic is passed in response to the pressure sensor sensing a negative pressure and the FTPT sensing a decaying fuel tank pressure.

3. The hybrid vehicle system of claim 1, wherein the instructions further enable the controller to indicate the diagnostic is not passed in response to the pressure sensor sensing a non-negative pressure.

4. The hybrid vehicle system of claim 3, wherein the instructions further enable the controller to adjust one of a depressurization rate of the fuel tank, a refueling fill rate of the fuel tank, and a reverse purging of the upstream canister in response to the diagnostic not being passed.

5. The hybrid vehicle system of claim 1, wherein the plurality of canisters further comprises a canister arranged between the upstream canister and the downstream canister.

* * * * *